S. A. EKEHORN.
DIGGING MACHINE.
APPLICATION FILED APR. 18, 1912.
1,096,160.
Patented May 12, 1914.
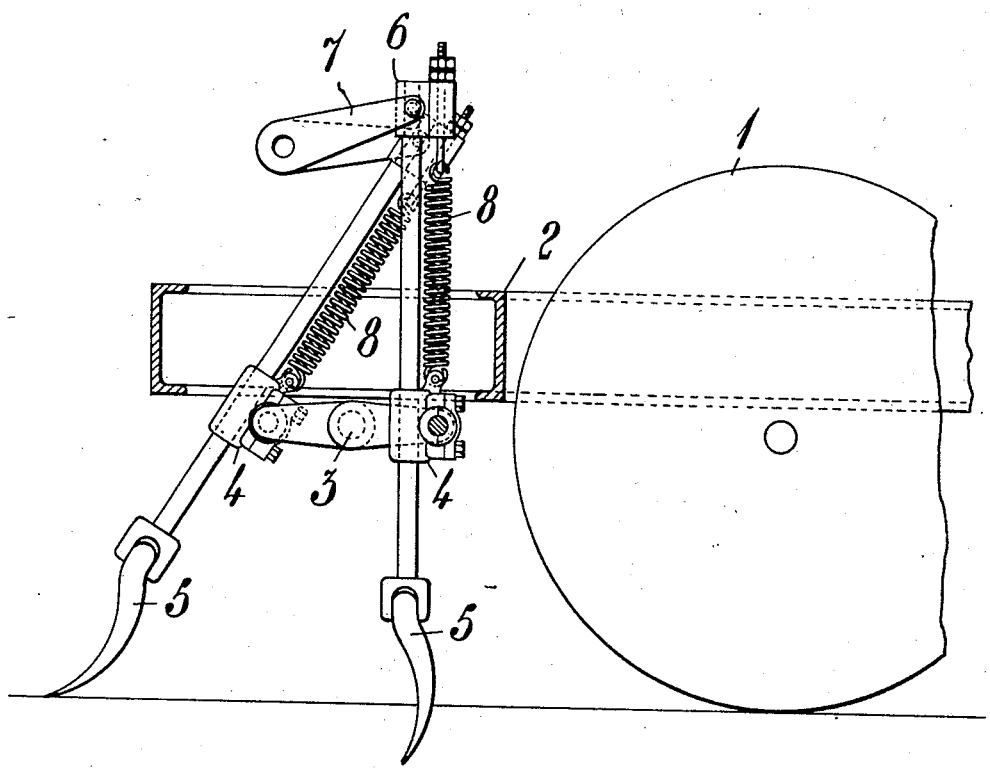

UNITED STATES PATENT OFFICE.

SVEN AUGUST EKEHORN, OF STOCKHOLM, SWEDEN.

DIGGING-MACHINE.

1,096,160.  Specification of Letters Patent.  Patented May 12, 1914.

Application filed April 18, 1912. Serial No. 691,658.

*To all whom it may concern:*

Be it known that I, SVEN AUGUST EKEHORN, a subject of the King of Sweden, residing at Stockholm, Sweden, have invented new and useful Improvements in Digging-Machines, of which the following is a specification.

This invention relates to a digging-machine, which is so constructed that the digging tools themselves make the machine move forward.

The accompanying drawing shows a side elevation and partial section of the machine, constructed in accordance with the principles of my invention.

The machine consists of a frame or the like 2, supported by rollers 1. The front part of this frame serves to support the motor and in the rear part of the machine a rotary crank shaft 3 is arranged to which a plurality of cranks are attached. Each of the cranks is connected with a cross-piece 4, in which the handle of the digging or tilling tool is slidably mounted. The cross pieces 4 are rotatably connected to the cranks. The tool may be a spade, pitchfork or the like. The upper end of each handle is connected to a head 6, which is rotatably connected with an arm 7 and which by means of a spring 8 is connected with the cross-piece 4. The arms 7 may be supported in any suitable manner, as, for example, by being mounted on a shaft (not shown) carried by the frame 2.

The motor having been started, the crank shaft 3 is rotated, whereby one of the tools will be moved downward and to the rear thereby forcing the machine forward *i. e.* to the right in the drawing. When the tool occupies the position shown at the left of the drawing, it has just come out of the soil, and it thereafter moves upward and forward until again it occupies the position shown at the right of the drawing. Should the tool strike a stone or other hard object when it is again moved downward the spring will be extended, and the tool will not be damaged.

The number of tools used depends upon the width of the machine. In a machine constructed in accordance with the principles of my invention, it is preferable, that alternate tools have the same motion.

In order to render possible a turning over of the soil dug up, the machine can at the tail end be provided with catches (not shown in the drawing) against which the tilting tools will strike during their motion backward and thereby be turned around their longitudinal axis, but during their motion forward they are brought back to their right positions by the said catches.

Having now particularly described and ascertained the nature of my said invention and in what manner the same is to be performed I declare that what I claim is:

In a digging machine, in combination, a frame provided with wheels, a rotatable crank shaft supported on said frame, cranks carried by said shaft, tools having handles slidingly and rotatably mounted on said cranks, heads connected to the handles of said tools and positioned to hold the tools in an approximately perpendicular position when the tool is moved downward to enter the soil, and a yielding connection between said heads and said cranks.

In testimony whereof I have signed my name to this specification in the presence of two subscribing witnesses.

SVEN AUGUST EKEHORN.

Witnesses:
 IVETA CRIM,
 INGA JOHANSSAN.